(12) United States Patent
Park et al.

(10) Patent No.: US 11,615,712 B2
(45) Date of Patent: Mar. 28, 2023

(54) METHOD AND APPARATUS FOR PROVIDING TRAINING FOR TREATING EMERGENCY PATIENTS

(71) Applicant: NEWBASE INC., Seoul (KR)

(72) Inventors: Sun Young Park, Seoul (KR); Taekwon Song, Cheongju-si (KR)

(73) Assignee: NEWBASE INC., Seoul (KR)

( * ) Notice: Subject to any disclaimer, the term of this patent is extended or adjusted under 35 U.S.C. 154(b) by 0 days.

(21) Appl. No.: 17/733,526

(22) Filed: Apr. 29, 2022

(65) Prior Publication Data

US 2022/0270502 A1   Aug. 25, 2022

Related U.S. Application Data

(63) Continuation of application No. PCT/KR2020/014269, filed on Oct. 19, 2020.

(30) Foreign Application Priority Data

Oct. 30, 2019   (KR) .................. 10-2019-0136026
Feb. 5, 2020   (KR) .................. 10-2020-0013419

(51) Int. Cl.
*G09B 5/06*   (2006.01)
*G09B 19/00*   (2006.01)

(52) U.S. Cl.
CPC .............. *G09B 5/06* (2013.01); *G09B 19/00* (2013.01)

(58) Field of Classification Search
CPC .......... G09B 5/02; G09B 19/00; G16H 50/50; G16H 10/60; G16H 30/20; G16H 50/20
See application file for complete search history.

(56) References Cited

U.S. PATENT DOCUMENTS 6,747,672 B1 *   6/2004   Haakonsen ............ G16H 50/50
                                                                   715/764
2014/0078137 A1   3/2014   Peddi et al.
(Continued)

FOREIGN PATENT DOCUMENTS

KR   10-2007-0008316 A   1/2007
KR   10-2019-0073678 A   6/2019
(Continued)

OTHER PUBLICATIONS

International Search Report issued in PCT/KR2020/014269; dated May 13, 2021.
(Continued)

*Primary Examiner* — Robert J Utama
(74) *Attorney, Agent, or Firm* — Studebaker & Brackett PC

(57) ABSTRACT

A method for providing training for treating emergency patients is provided. The method for providing treatment training for an emergency patient comprises the steps of: generating a virtual patient scored according to the virtual patient's conditions on the basis of medical statistics; automatically allocating necessary treatment data on the basis of vital signs of the generated virtual patient; providing a user with the generated virtual patient and the vital signs on the basis of augmented reality by using a user terminal; receiving, at the user terminal, the result of treatment performed by the user on the basis of the vital signs of the virtual patient; and providing evaluation data by comparing the result of treatment performed by the user with the treatment data for the virtual patient.

9 Claims, 14 Drawing Sheets

(56) References Cited

U.S. PATENT DOCUMENTS

| | | | |
|---|---|---|---|
| 2014/0113263 A1* | 4/2014 | Jarrell | G09B 23/28 |
| | | | 434/262 |
| 2015/0044653 A1 | 2/2015 | Levine et al. | |
| 2016/0019352 A1* | 1/2016 | Cohen | G16H 15/00 |
| | | | 705/3 |
| 2017/0213473 A1 | 7/2017 | Ribeira et al. | |
| 2018/0293802 A1 | 10/2018 | Hendricks et al. | |

FOREIGN PATENT DOCUMENTS

| | | |
|---|---|---|
| KR | 10-2019-0087912 A | 7/2019 |
| WO | 2019/173677 A1 | 9/2019 |

OTHER PUBLICATIONS

"Notification of Reasons for Refusal" Office Action issued in KR 10-2020-0013419 mailed by the Korean Intellectual Property Office dated Jun. 16, 2021.

"Decision to Grant a Patent" Office Action issued in KR 10-2020-0013419 mailed by the Korean Intellectual Property Office dated Nov. 10, 2021.

The extended European search report issued by the European Patent Office dated Nov. 21, 2022, which corresponds to European Patent Application No. 20883070-1218 and is related to U.S. Appl. No. 17/733,526.

\* cited by examiner

FIG. 9

| 2 | First aid for injury | 1 | Multiple/severe injuries | Airway maintenance | 1 | Airway securement | Airway securement | A3 | Below consciousness p |
| 2 | First aid for injury | 1 | Multiple/severe injuries | Airway maintenance | 2 | Airway securement | Nasopharyngeal airway | A4 | Gag reflex, no fracture of base of cranial |
| 2 | First aid for injury | 1 | Multiple/severe injuries | Oxygen administration | 3 | Oxygen administration | Face mask, mobile oxygen | B3, B5 | |
| 2 | First aid for injury | 1 | Multiple/severe injuries | Cervical spine fixation | 4 | Cervical spine fixation | Cervical vertebrae | D1 | |
| 2 | First aid for injury | 1 | Multiple/severe injuries | Pressure hemostasis | 5 | Pressure hemostasis | Hemostatic gauze Compression bandage | D9, D13 | Identification of life-threatening external bleeding |
| 2 | First aid for injury | 1 | Multiple/severe injuries | Venous securement | 6 | Venous securement | Intravenous injection set, IV Cathether, Physiological saline Lactate ringer's solution | C7D, C8D, M4D /M5D | Systolic blood pressure <90 |
| 2 | First aid for injury | 1 | Multiple/severe injuries | Vital sign monitoring | 7 | Oxygen saturation, Electrocardiography | Electrocardiogram device | X7 | |
| 2 | First aid for injury | 1 | Multiple/severe injuries | Body temperature maintenance | 8 | Body temperature maintenance | Warm blanket | E5 | |
| 2 | First aid for injury | 1 | Multiple/severe injuries | Spinal fixation | 9 | Spinal fixation | Long spine plate | D2 | During application |

FIG. 10

| Category | First aid procedure | treatment classification | First Aid Details | First aid kit | Tool list code |
|---|---|---|---|---|---|
| Airway maintenance | Endotracheal intubation | A1D | Endotracheal intubation | Manual manipulation, Equipment for securing airway around glottis, such as and laryngeal mask | A1,A5D (A6D),A7D,X |
| | Airway maintenance | A2D | Airway maintenance | Laryngoscope set,Extraglottic airway maintainer | A5D,A7D |
| | Airway maintenance | A3 | Airway securement | Oropharyngeal airway | A3 |
| | Airway maintenance | A4 | Airway securement | Nasopharyngeal airway | A4 |
| | Foreign body removal | A5D | Foreign body removal | Laryngoscope set | A5D |
| | Foreign body removal | A6 | Foreign body removal | Heimlich's law | A9 |
| | Airway maintenance | A7D | Bronchodilator for suction | Bronchodilator for suction | M2D |
| Breathing assistance | Oxygen administration | B1 | Oxygen administration | Bag valve mask, Mobile oxygen | B1, B5 |
| | Oxygen administration | B2 | Oxygen administration | Bag valve mask, Non-rebreathing mask, Mobile oxygen | B1/B4, B5 |
| | Oxygen administration | B3 | Oxygen administration | Non-rebreathing mask, Mobile oxygen | B4, B5 |
| | Oxygen administration | B4 | Oxygen administration | Face mask, Mobile oxygen | B3, B5 |
| | Oxygen administration | B5 | Oxygen administration | Nasal cannula, Face mask, Mobile oxygen | B2/B3, B5 |
| | Oxygen administration | B6 | Oxygen administration | Nasal cannula, Mobile oxygen | B2, B5 |
| Circulation assistance | CPR | C1 | Automatic Heart Shock | Automatic defibrillator | C1, C2 |
| | CPR | C2 | Chest compressions | Metronome, chest resistance monitoring device,(chest compressions) | C1, C2 |
| | CPR | C3 | Chest compressions | Mechanical chest compression device | C5 |
| | Intravenous securement | C4D | Intravenous securement | Intravenous injection set,IV Catheter,Physiological saline/Lactate ringer's solution | C7D, C8D M4D/M5D |
| | Intravenous securement | C5D | Intravenous securement | Intravenous injection set,IV Catheter Physiological saline | C7D, C8D M4D |
| | Intravenous securement | C6D | Intravenous securement | Intravenous injection set,IV Catheter,50% Glucose solution/10% Glucose solution | C7D, C8D M3D |
| | Drug injection | C7D | Sublingual administration of nitroglycerin | nitroglycerin | M1D |
| Disability | Cervical fixation | D1 | Cervical fixation | Cervical vertebrae | D1 |
| | Spinal fixation | D2 | Spinal fixation | Long spine plate | D2 |
| | Pelvic fixation | D3D | Pelvic fixation | Osseous bone fixation device | O1,D8 |
| | Splint fixation | D4 | Splint fixation | Splint (air, vibration, pad) | D4 |
| | Sealing dressing | D5 | Sealing dressing | Three-sided sealing dressing | D13 |
| | Pressure hemostasis | D6 | Pressure hemostasis | Hemostatic gauze, compression bandage | D9,D13 |
| | Wound cleaning | D7 | Wound cleaning | Burn gauze, Sterile saline solution Warm blanket | D10,S4,E5 |
| | Wound dressing | D8 | Wound dressing | Disinfectant gauze, Dressing set | D11,D12 |
| | Wound dressing | D9 | Amputation treatment | Airtight container, Sterile saline solution | D15,S4 |
| | Eye patch application | D10 | Eye patch application | Eye patch | D16 |
| | Glucose provision | D11D | Oral glucose provision | 50% Glucose solution | M3D |
| | Electrolyte administration | D12 | Electrolyte administration | Electrolyte drink | M18 |
| | Position change | D13 | Position change | (Supine), Sandbag | D14 |
| | Position change | D14 | Position change | Warm blanket | E5 |
| Exposure /environment control | Electrocardiogram | E1 | 12-Lead electrocardiogram | Electrocardiogram device | X7 |
| | Body temperature maintenance | E2 | Proper body temperature maintenance | Warm blanket | E5 |
| | Dead patient treatment | E3 | Dead patient treatment | Warm blanket | E5 |
| Protocol | CPR | P1 | CPR | Reference - subclass - cardiac arrest | 1-1,Cardiac arres |

METHOD AND APPARATUS FOR PROVIDING TRAINING FOR TREATING EMERGENCY PATIENTS

CROSS-REFERENCE TO RELATED APPLICATIONS

The present application is a continuation of International Patent Application No. PCT/KR2020/014269, filed on Oct. 19, 2020, which is based upon and claims the benefit of priority to Korean Patent Application Nos. 10-2019-0136026 filed on Oct. 30, 2019 and 10-2020-0013419 filed on Feb. 5, 2020. The disclosures of the above-listed applications are hereby incorporated by reference herein in their entirety.

BACKGROUND

The inventive concept relates to a method of providing training for treating emergency patients. More specifically, the inventive concept relates to a method and apparatus for providing a training method for treating emergency patients, which create a virtual patient scored according to the virtual patient's status (consciousness, vital signs, degree of trauma, or the like) based on medical statistics, automatically assign necessary treatment data to the created virtual patient, and evaluate the treatment performed by the user.

Hospitals, the military, fire stations, or the like have conducted training for people who is to handle various disaster situations in preparation for various disaster situations.

Training in preparation for disaster situations is based on on-the-ground training assuming a virtual situation.

Currently, the most commonly used training method is to divide the roles among the input personnel using various on-the-ground training kits and to devise countermeasures.

In the case of using such a method, it is possible to train the role division, coping plan, and overall disaster situation response system, but it is difficult to provide training to check the patient's condition and prepare a direct response plan for the patient.

SUMMARY

The problem to be solved by the inventive concept is to provide emergency patient treatment training for realizing and providing a virtual patient similar to a real patient.

Embodiments of the inventive concept provide a method for providing a training method for treating emergency patients, which create a virtual patient scored according to the virtual patient's status (consciousness, vital signs, degree of trauma, or the like) based on medical statistics, automatically assign necessary treatment data to the created virtual patient, and evaluate the treatment performed by the user.

However, problems to be solved by the inventive concept may not be limited to the above-described problems. Although not described herein, other problems to be solved by the inventive concept can be clearly understood by those skilled in the art from the following description.

According to an embodiment, a method of providing emergency patient treatment training includes creating a virtual patient scored according to a condition of the virtual patient based on medical statistics, setting vital signs by additionally deriving symptoms caused by injuries of the created virtual patient and severity classification, automatically assigning necessary treatment data based on the set vital signs, providing the created virtual patient and the vital signs to a user based on augmented reality using a user terminal, receiving a result of treatment of the user based on the vital signs of the virtual patient through the user terminal, and providing evaluation data by comparing the treatment data for the virtual patient and the result of the treatment of the user.

Further, the providing of the virtual patient may include recognizing an image virtual patient card photographed by the user terminal; and displaying the virtual patient based on augmented reality on the recognized virtual patient card.

Further, the providing of the virtual patient may include providing a virtual patient with same conditions to a plurality of users in which have recognized the virtual patient card, and the virtual patient with a condition corresponding to a performed treatment may be provided to the plurality of users when the treatment is performed on the virtual patient by at least one user.

Further, the vital signs may include at least one of injuries, symptoms, main complaint required for treatment of the virtual patient.

Further, the scored virtual patient may be determined based on a preselected user ability, an accident location, an accident type, the number of patients, and a difficulty level.

Further, the scored virtual patient may have reflected, as a score, at least one or more values of age, gender, nationality, injury site, injury type, injury degree, respiration rate, pulse rate, blood pressure, body temperature, blood oxygenation level, type of breathing, pain level, and level of consciousness (Glasgow Coma Scale).

Further, the method for providing emergency patient treatment training according to an embodiment may be implemented as a program for providing emergency patient treatment training that is combined with a computer that is hardware and stored in a medium to execute the method described above.

According to an embodiment, an apparatus for providing emergency patient treatment training includes one or more processors and one or more memories that stores instructions that, when executed by the one or more processors, cause the one or more processors to perform an operation, and the operation performed by the one or more processors includes operation for creating a virtual patient scored according to a condition of the virtual patient based on medical statistics, operation for setting vital signs by additionally deriving symptoms caused by injuries of the created virtual patient and severity classification, operation for automatically assigning necessary treatment data based on the set vital signs, operation for providing the created virtual patient and the vital signs to a user based on augmented reality using a user terminal, operation for receiving a result of treatment of the user based on the vital signs of the virtual patient through the user terminal, and operation for providing evaluation data by comparing the treatment data for the virtual patient and the result of the treatment of the user.

Other specific details of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7 to 10 are diagrams for describing an example of generating treatment data necessary for the generated virtual patient according to an embodiment.

DETAILED DESCRIPTION

Figure 1:
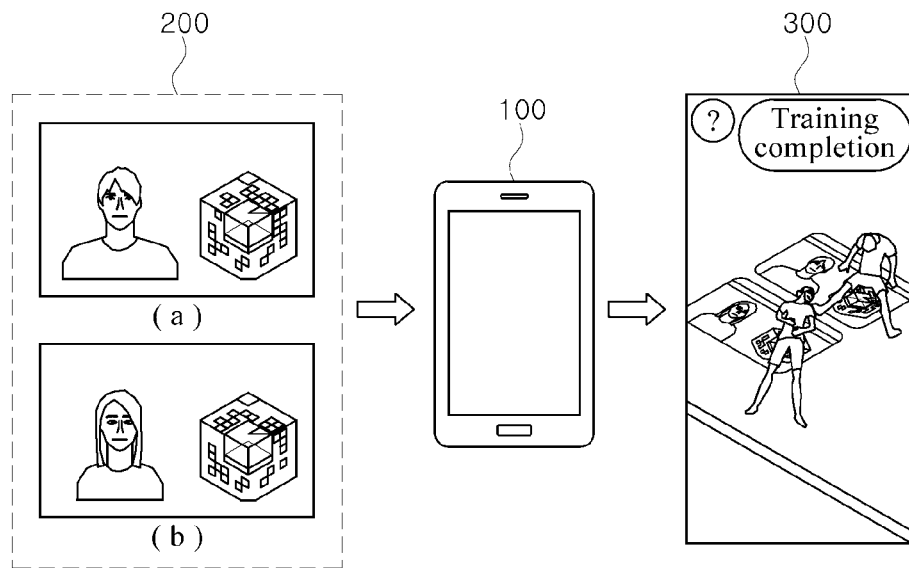
FIG. 1 is a diagram for schematically describing a method for providing emergency patient treatment training according to an embodiment of the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Hereinafter, embodiments of the present disclosure will be described with reference to the accompanying drawings.

FIG. 1 is a diagram for schematically describing an emergency patient treatment training method according to an embodiment of the inventive concept.

Referring to FIG. 1, in the emergency patient treatment training method according to an embodiment, a virtual patient card 200 may be recognized using a user terminal 100 and then a virtual patient may be displayed (300) on the recognized virtual patient card based on augmented reality and provided to a user.

Here, the virtual patient may be a scored virtual patient generated according to the state of the virtual patient in a server (not shown) or the user terminal 100 based on medical statistics. Here, the scored virtual patient may reflect, as a score, at least one value of age, gender, nationality, injury site, injury type, injury degree, respiration rate, pulse rate, blood pressure, body temperature, blood oxygenation level, type of breathing, pain level, and level of consciousness (Glasgow Coma Scale). In addition, the generated virtual patient may be determined based on a preselected user ability, an accident location, an accident type, the number of patients, and a difficulty level.

In one embodiment, the virtual patient may be augmented and provided by a method of augmented reality (AR) using a marker, or the like. In another embodiment, a virtual patient may be provided by a method of virtual reality (VR). As an embodiment, a virtual patient may be provided using a head mounted display (HMD) device, and as another embodiment, a virtual patient may be provided by a method of mixed reality (MR) in which augmented reality and virtual reality are merged.

The virtual patient provided herein includes patients with various symptoms, and refers to a patient in a virtual form implemented such that corresponding symptoms are identified by eyes.

For example, in the case of a burn patient, the virtual patient are implemented such that the form of a burn in a specific area and the state of consciousness of the patient due to the burn (such as being unable to walk or unable to open eyes, or the like) are visible.

The virtual patient may be provided not only to be visible but to make actions according to symptoms or generate sounds.

For example, when the provided virtual patient has difficulty breathing, the provided virtual patient may be provided with an action of clenching the chest and a sound such as breathing heavily or saying that the breath is short.

Meanwhile, the method of providing a virtual patient may also be provided with various configurations.

As an embodiment, when one person performs the training method provided by the inventive concept, a virtual patient may be provided based on only the user terminal as described above.

In another embodiment, as one or more users perform training, a virtual patient card may be provided together to provide a virtual patient based on a character and an identification mark included in the virtual patient card.

Specifically, referring to the virtual patient card 200 shown in FIG. 1, it can be seen that the character and the identification mark are included together in the virtual patient card 200.

The virtual patient card 200 (a) is a card including a young male character, and the virtual patient card 200 (b) is a card including a young female character. The identification mark is displayed on the right of each of the virtual patient cards 200.

The character of the virtual patient card is provided to distinguish the characteristics of gender/age and a specific patient, and the identification mark is for deriving a virtual patient with a relevant symptom when the identification mark is recognized and may serve to determine the location of the patient's appearance.

In addition, basic information such as age, gender, and body type of the character may be included together with the character displayed in the virtual patient card. The basic information may be provided in a visually displayed form or may be directly marked in the virtual patient card.

When there are multiple users who are trained together for emergency patient treatment according to the inventive concept and multiple virtual patient cards, the characters in the virtual patient cards may be displayed to clearly indicate who is a virtual patient referred to during communication between the users.

Even in an actual disaster situation, people who rescue patients make communication using characteristics, impressions, or the like indicating basic information of the patients. In an actual disaster situation, a person who has performed first aid requests transfer by indicating the patient's condition with a bracelet, necklace or the like, to avoid confusion to a person transferring the patient.

Therefore, in the inventive concept, similar to the actual situation, a patient who needs to be transferred or a corresponding patient may be referred to by using a character in order to facilitate communication between users.

Users who view the virtual patient through the same virtual patient card at the same time point are all provided with the same virtual patient. As will be described later, when the patient status is identified and and treatment is taken for a specific virtual patient, the virtual patient as treated is displayed to users viewing the virtual patient through the same virtual patient card at the same time point.

That is, in other words, with respect to the virtual patient provided in the same virtual patient card at the same time point, the same status of the virtual patient is synchronized and shared with a plurality of users.

When a plurality of users are training together, if virtual patients have different statuses for the plurality of users, there is a difficulty in training. In most cases, treatment is cooperatively taken on a virtual patient. Therefore, as in the inventive concept, when the same patient status is shared with a plurality of users, there is an effect that training can be performed similarly to the actual situation.

Next, a user server (not shown) or the user terminal 100 automatically allocates necessary treatment data based on the vital signs of the generated virtual patient.

Here, the treatment data may be a standard for correct answers to determine whether the user's treatment is appropriate later, and the vital signs may include at least one of injury, symptoms, and main complaint required for treatment of the virtual patient.

When the user performs a treatment based on the vital signs of the virtual patient displayed on the user terminal 100, the user terminal 100 may receive and record results of the user's treatment.

Furthermore, the server (not shown) or the user terminal 100 compares the treatment data for the virtual patient and the results of the user's treatment and provides evaluation data to the user, thus allowing the user to train the emergency patient treatment using the virtual patient card.

In addition, there are various methods of providing training using the virtual patient card of the inventive concept.

In one embodiment, a training provider providing training provides training by outputting a patient in a specific status such that the user can learn the patient's status associated with a symptom and/or disease specified for a user.

In another embodiment, urgency is trained using a plurality of virtual patient cards. A plurality of virtual patient cards are provided to a user, and the user is subjected to training to allow the user to identify the statuses of virtual patients output through the virtual patient cards and perform treatments on virtual patients in order of urgency.

In this case, the user is trained to perform treatments in consideration of the number of patients who will die over time as a result of saving a specific patient by performing treatments on the specific patient, or the like, rather than perform treatments in the order of urgency.

Therefore, training to perform treatments on virtual patients in the order of urgency provides training to perform treatments in consideration of the condition of the field and the conditions of a plurality of virtual patients comprehensively, rather than training to necessarily perform treatments in order of urgency.

As another embodiment, when a plurality of users performs training, the plurality of users may perform training using one or more virtual patient cards randomly. As described above in the description of the character of the virtual patient card, identification and treatment for patient conditions for a virtual patient output from a specific virtual patient card are provided by applying the same conditions even when viewed by other users. That is, the feedback of other users on the virtual patient is reflected and displayed in real time.

As another embodiment of a method of providing a virtual patient including various configurations, a virtual patient may be provided by using a virtual patient card and an emergency patient treatment training kit together.

The emergency patient treatment training kit is a training kit provided for on-the-ground training which is training conducted to make an immediate and effective response in real disaster situations, such as assuming a virtual situation in the event of various disasters such as fire, devising responses and countermeasures for each type of disaster and familiarizing the user himself/herself with the tasks in charge.

The emergency patient treatment training kit is provided as a kit in which a virtual disaster site, a classification team, a treatment team, a transfer team, a disaster management situation board, a medical institution, a patient, a medical team, and equipment, and the like are respectively configured as models as needed.

Therefore, when training is provided by using the emergency patient treatment training kit and virtual patient card together, training and treatments for the patient are used as the virtual patient card, and in the case of the rest except for the patient, training is comprehensively performed using the emergency patient treatment training kit.

Figure 2:
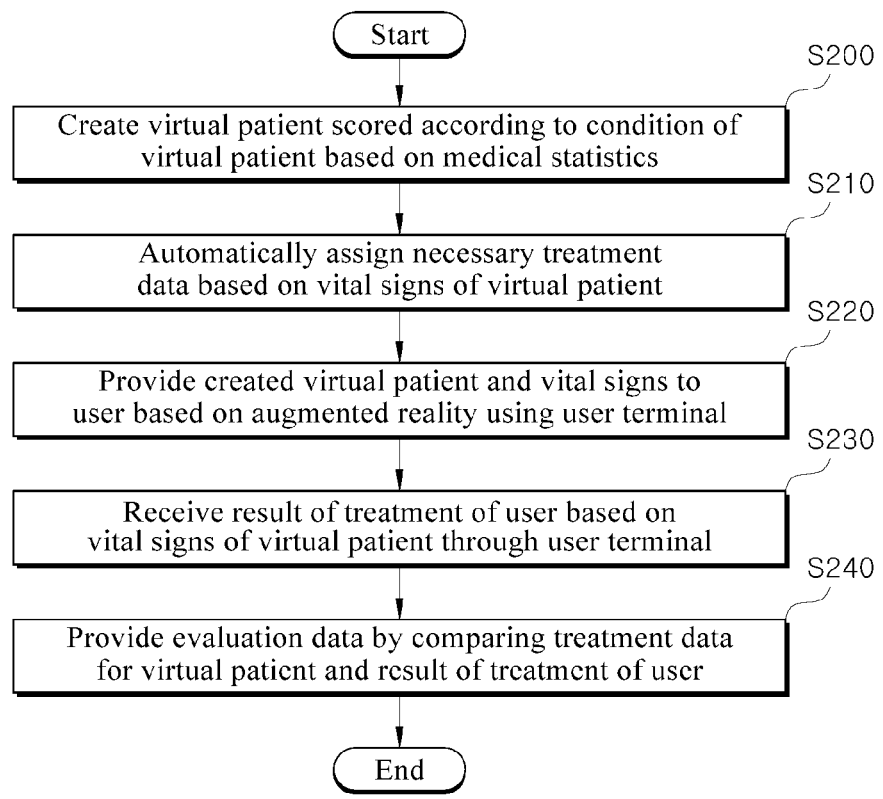
FIG. 2 is a flowchart for describing a method for providing emergency patient treatment training according to an embodiment.

FIG. 2 is a flowchart for describing a method for providing emergency patient treatment training according to an embodiment.

Referring to FIG. 2, in S200, the emergency patient treatment training method according to an embodiment may create a scored virtual patient according to the condition of the virtual patient based on medical statistics. Here, the scored virtual patient may be determined based on at least one of a preselected user's ability, an accident location, an accident type, the number of patients, or a difficulty level.

In addition, the scored virtual patient may reflect, as a score, at least one value of 1) Age 2) Gender 3) Nationality 4) Injury Area 5) Injury Type 6) Injury Degree 7) Respiratory Rate 8) Pulse Rate 9) Blood Pressure 10) Body Temperature 11) Blood Oxygen Saturation 12) Type of breathing 13) pain level 14) level of consciousness (Glasgow Coma Scale), as a variable.

After the above-described variable is generated, symptoms due to the injury and the severity classification of the patient may be additionally derived and stored as values called vital signs.

Hereinafter, the variables will be described in more detail as follows.

1) Age:

It is a patient's age (age in full). Normal values of vital signs (respiratory rate, pulse rate, blood pressure) vary according to age, and serve as a criterion for whether to perform a specific treatment (under 65 years of age or the like).

When the age is randomly assigned, a value may be set within a stratified range by age group. For example, 0-1 is a baby, 1-3 is an infant, 3-6 is a preschool child, 6-12 is a school-age child, 13-18 is a youth, 19-64 is an adult, and 65 or older is an elderly person.

The random distribution of age may vary depending on which disaster scenario a user chooses. For example, when the location of disaster is a gym, adults (19-64 years old) will be overwhelmingly, but when the location of disaster is an elderly nursing home, the elderly (65 years old or older) will be overwhelmingly large.

2) Gender:

It is the biological sex of the patient. The gender is classified into male/female, and the male to female gender ratio is 55% for male and 45% for female according to statistical analysis data, but follows a one-to-one demographic distribution of the entire Republic of Korea.

3) Nationality:

It is the nationality of a patient and a language used may be changed accordingly. This is to allow users to experience patients who cannot express their symptoms in Korean in emergency situations. When data from overseas patients are secured and analysis is completed later, detailed factors such as underlying diseases caused by national and racial differences may be applied to other variables. For example, the current allocation ratio for Koreans and foreigners is 95 to 5.

4) Injury Area:

It is an area where a patient has suffered physical damage due to an accident. The physical wound suffered by the patient may be visually represented when the patient's character is displayed as a 3D image on a client. After classifying the whole body into 19 parts, each part is reclassified into 1 to 9 parts, so that parts to be injured are a total of 73 parts. Up to three injuries may exist in one virtual patient.

The injury area affects the symptoms of the injury. A patient with a head injury may have a reduced level of consciousness, and a patient with a chest injury may have difficulty breathing. In addition, a patient with moderate or more severe injury to the leg may have reduced gait ability, and thus the result of classification of patient's severity may be changed.

5) Injury Type:

It is the type of physical injury suffered by a patient as a result of an accident. There are 18 types of injuries: abrasions, bruises, cuts, lacerations, detachments, penetrating wounds, burns, hematomas, foreign bodies, aspiration, sprains, strains, fractures, crushing, dislocations, blisters, edema, and amputations. The ratio for the type of injury may vary according to the type of accident. The number of burns and carbon monoxide poisoning patients increases at the scene of a fire, and the number of patients with fractures and bruises increases at the scene of a large-scale traffic accident. In addition, as it was found from the results of statistical analysis that the types of injuries that may occur depending on the injury area are different, this can be applied at randomization.

6) Injury Severity Score:

It is the degree of injury suffered by a patient as a result of the accident. When an injury exists, a random number of scores (1-6 points) of the Abbreviated Injury Scale (AIS) which is a subscale of the Injury Severity Score (ISS), is applied. The injury severity score is defined as follows [Table 1].

TABLE 1

| Score | Description |
|---|---|
| 1 | Minor |
| 2 | Moderate |
| 3 | Severe, not life-threatening |
| 4 | Severe, life-threatening, survival probable |
| 5 | Critical, survival uncertain |
| 6 | Maximal, possibly fatal |

Systemic Inflammatory Response Syndrome (SIRS), which evaluates severity as a score based on pulse, white blood cell count, respiration rate, and body temperature, may also be used when the system is expanded to enable creation of infected patients in the future.

The injury severity score affects the type and severity of symptoms caused by the injury. Calculation may be performed later such that it may be derived through an algorithm that when a patient have a moderate (2) injury to the head, the patient may experience nausea/vomiting, and when the patient have a severe (3-5) injury, the patient may lose consciousness.

7) Respiratory Rate:

It refers to the number of breaths per minute of a patient. The patient's vital signs may have different normal values depending on the age group. Each value of vital signs is assigned a random value within the range of normal values, and the effect of injury is added thereto. For example, when a 22-year-old adult inhales carbon monoxide into the lungs and the degree of injury is greater than 3, +10±2 is added to a randomly determined respiratory rate within the range of 12-20. In addition, when the final calculated respiration rate is abnormal (>20), the type of respiration change may be additionally assigned.

8) Pulse Rate

It is the pulse rate per minute of a patient, and a normal value may vary depending on the age group. A default value is set within the normal range for each age, and the effect of injury is added. For example, when a hematoma occurs on the head due to a head injury, +20±5 is added to the pulse rate.

9) Blood Pressure

It is the systolic and diastolic blood pressure of a patient. The unit of the blood pressure is mmHg, and the diastolic blood pressure cannot be higher than the systolic blood pressure. The systolic blood pressure is set at random within a normal range for each age, and the effect of injury is added. The diastolic blood pressure is calculated by assigning the systolic blood pressure and then calculating an added value according to the statistical analysis from the systolic blood pressure. In the case of 0-1 years old, (systolic blood pressure)−35±5, in the case of higher than 1 year old, (systolic blood pressure)−40±5 is assigned as diastolic blood pressure.

10) Body Temperature

It is a patient's body temperature, and a normal value may vary depending on the age group. After assigning a random value within a normal range for each age, the effect of injury is added.

11) Blood Oxygen Saturation

It is a patient's blood oxygen saturation (SpO2), and 95% to 100% is generally considered to be normal. After assigning a random value within a normal range, a variation value is added only when there is an injury that affects the patient's breathing ability.

12) Type of Breathing

It refers to a patient's breathing pattern. The type of breathing is not determined in advance, and may be assigned only when the respiration rate reaches an abnormal value. Even at the same respiration rate, the required treatment may differ depending on the type of breathing. For example, the type of breathing may be implemented as shown in [Table 2] below.

TABLE 2

| Number | Type of breathing | Respiration rate | Description |
|---|---|---|---|
| 0 | Apnea | 0 | Absence of breathing |
| 1 | Normal | 1-20 | Breathing is silent, regular and not strenuous |
| 2 | Tachypnea | >24 | Abnormal increased respiration rate |
| 4 | Hyperpnea | >20 | Rapid deep breathing. In case of patients in coma, it means that there is injury to the midbrain and pons due to infarction, hypoxia, or hypoglycemia. |

13) Pain Level

It quantifies the degree of pain experienced by a patient. According to the NRS (Numerical Rating Scale), the pain level is a scale where 0 point is no pain, and 10 point is worst imaginable pain. Pain is a relative concept, and even when the persons have suffered the same type of injury and the same degree of injury, the pain intensities experienced by the persons may be different. According to an embodiment, pain is derived based on the injury severity score (ISS), and ±2 is added to the number obtained by multiplying two by the highest ISS value among up to three injury areas, and the maximum value is limited to 10.

14) Level of Consciousness (Glasgow Coma Scale)

It quantifies a patient's level of consciousness. The level of consciousness is based on the Glasgow Coma Scale, on a scale of 15, with lower scores indicating more coma. GCS can be calculated by adding up the scores of the detailed items of Eye response, Verbal response, and Motor response due to stimulation.

TABLE 3

Eye response, E

| Score | Description |
|---|---|
| 4 | Opens eyes spontaneously |
| 3 | Opens eyes in response to voice |
| 2 | Opens eyes in response to pain |
| 1 | Does not open eyes |

TABLE 4

Verbal response, V

| Score | Description |
|---|---|
| 5 | Oriented, converses normally |
| 4 | Confused, disoriented |

TABLE 4-continued

Verbal response, V

| Score | Description |
|---|---|
| 3 | Words |
| 2 | Makes sounds |
| 1 | Makes no sounds |

TABLE 5

Motor response, M

| Score | Description |
|---|---|
| 6 | Obeys commands |
| 5 | Localizes to painful stimuli |
| 4 | Flexion/withdrawal to painful stimuli |
| 3 | Abnormal flexion to painful stimuli, decorticate response |
| 2 | Extension to painful stimuli, decerebrate response |
| 1 | Makes no movements |

Referring to Tables 3 to 5 above, when the GCS score is less than 4, a patient is coma, when the GCS score is less than 8, a patient is semi-coma, when the GCS score is less than 13, a patient is stupor, when the GCS score is less than 15, a patient is drowsy, and when he GCS score is 15, a patient is alert. Since the GCS score may be decreased due to decreased consciousness due to head injury, the score is assigned according to a probabilistic distribution in which each score can be derived through statistical analysis of actual patient cases. For example, when the degree of injury to the head (excluding nose, mouth, and chin) is 4 or higher (severe injury), 1-6 points of motor response among GCS detailed items are randomly assigned by applying the probability of 1:0:0:1:1:1.

Figure 3:
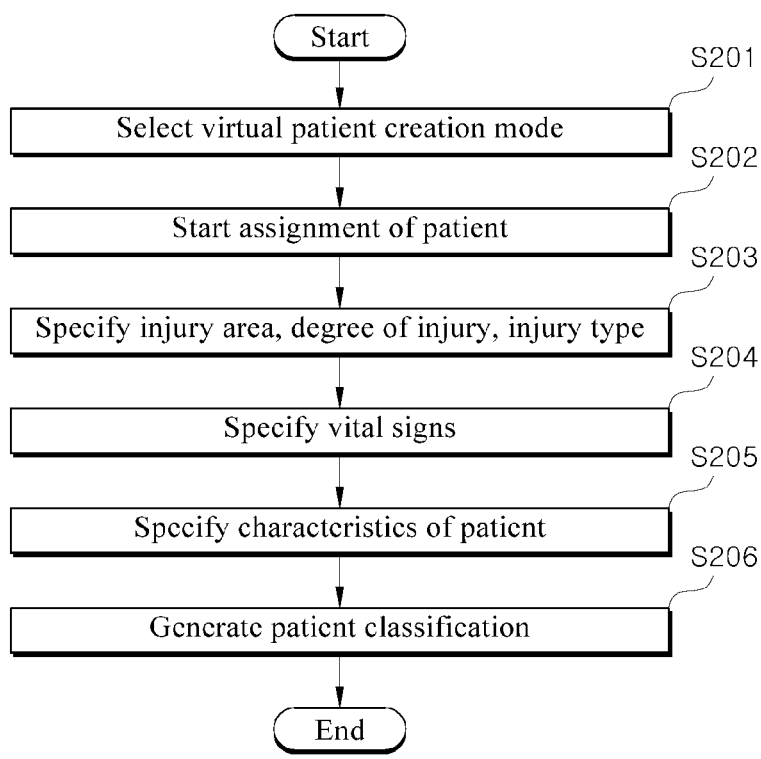
FIGS. 3 to 6 are diagrams for describing an example of generating virtual patient data according to an embodiment.
Figure 4:
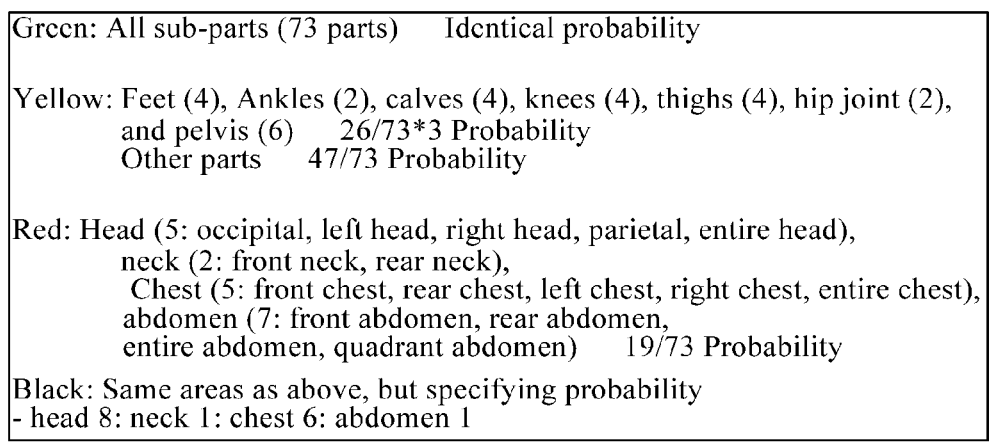

Hereinafter, an example of generating virtual patient data will be described in more detail with reference to FIG. 3.

In step S201, a virtual patient creation mode may be selected.

For example, one of a mode in which session data can be configured by selecting an accident location, an accident type, the number of patients, and a difficulty (ratio of severity of patients) in consideration of a user's ability, and a fixed mode in which fixed scenarios in which the location and difficulty are bundled in advance are only selected may be selected. A patient creation algorithm may create a particular patient more frequently according to a ratio specified in this step.

In step S202, when patient assignment is started, patient numbers are stored for the created patients by sequence numbers as first variables. This is to make it easy to configure and display the feedback of the treatment results for a specific patient among clients, rather than a sequence number for all the created patients to be retransmitted and accumulated to server database.

The gender of the patient is assigned with a probability of 50% and 50% based on the non-demographic ratio of 1 to 1. Nationality is also affected by the geopolitical probability, and there is a 95% chance of becoming a Korean, and a 5% chance of becoming a foreigner.

In step S203, the injury area of the patient, the degree of injury and the injury type are determined.

First, referring to FIG. 4, 1-3 injury areas may be specified, and MASS, which is one of the severity classification methods, classifies the severity of emergency patients into four types: Green, Yellow, Red, and Black. In order to artificially create a bias in the severity distribution according to difficulty, when each patient is created, the probability of injury to a specific area may be increased when specifying an injury area such that the characteristic corresponding to the patients of Green (walkable, normal consciousness), Yellow (impossible to walk, normal consciousness), Red (impossible to walk, unconscious), Black (dead) can be more strongly imposed.

In a case where the probabilistic distribution of each severity is to be artificially adjusted, since the yellow patients need to be injured in 26 areas of feet (4), ankles (2), calves (4), knees (4), thighs (4), hip joint (2), and pelvis (6) which affect walking ability, calculation should be performed by weighting calibration such that it has a higher probability (currently 3 times) than the probability of 26/73 among all of 73 parts of the body in specifying the injury areas. Patients in the Red category are more severe, and should have more severe injuries near major organs in the center of the body rather than the limbs. In the event of a serious injury, the patient's consciousness and 41 areas (2 elbows, 4 forearms, 4 thighs, 4 knees, 4 calves) are injured, so that calculation is performed by weighting calibration of probability of 41/73 (currently 2 times) among all of 73 parts of the body in specifying the injury areas. A black patient is a patient who has already died when the medical staff arrives, and belongs to a group of patients with a very low priority because medical treatment is to be given to other patients with a higher probability of survival than patients who are close to death in a disaster situation. According to the analyzed medical data, the main injured area of the deceased represents the ratio of head 8, neck 1, chest 6, and abdomen 1. The above ratio may be applied as a probability when creating a black patient whose death is certain to occur when randomly creating patients.

When a patient with a severity different from the desired severity is created after all of the items affecting classification, such as vital signs according to the specifying of injury to a specific area, are created, the existing data is destroyed and the method returns to step S203 to start to specify data again from the step of specifying an injury area. This branching point may be changed according to the throughput load of the processor after the algorithm is actually applied.

Figure 5:
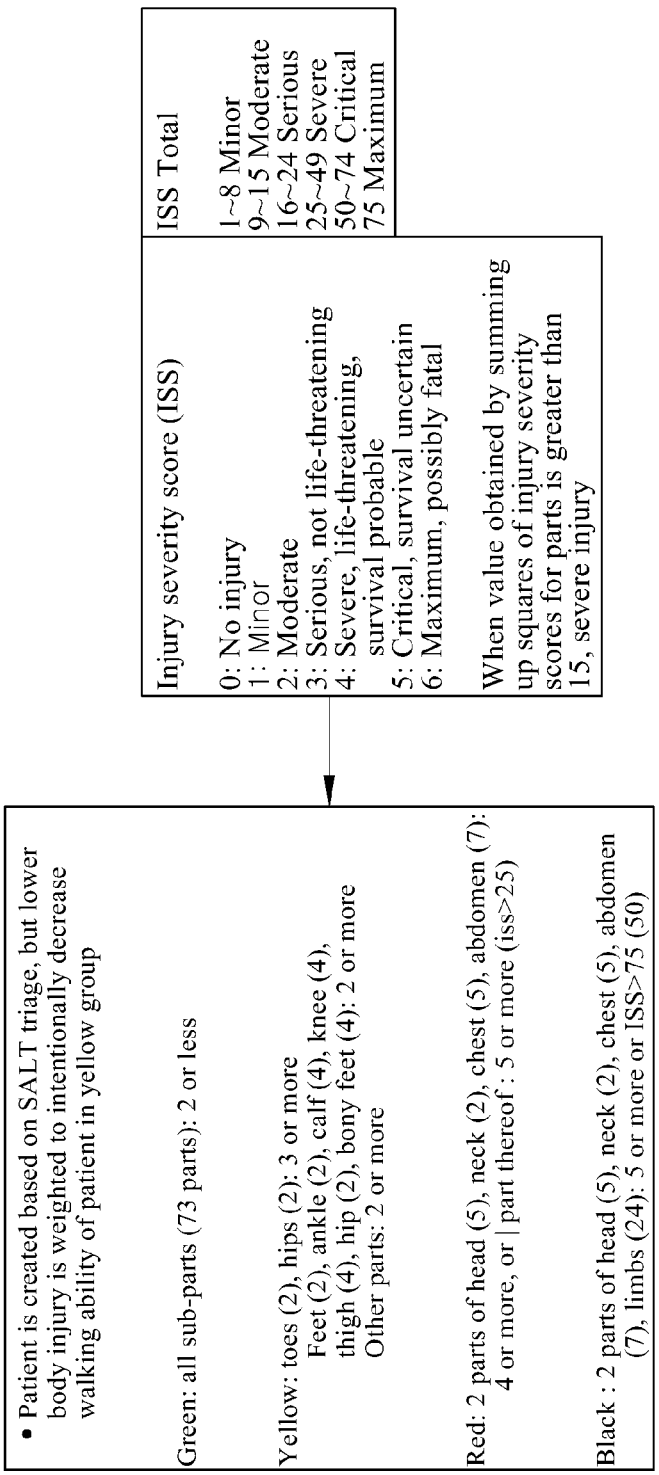

Next, referring to FIG. 5, after artificially adjusting the injury areas, the degree of injury for each injury area is set to a value between 1 and 6. In order to more closely match the patient to the severity classification, it may be necessary to give a certain degree or more of injury to a severe patient without giving the certain degree or more of injury to mild patients.

In this case, the degree of injury is given according to the ISS scale. Since the total score of the ISS determines the severity of the injury and the effect on the survival probability, the severity is specified based on the sum of the squares of the severity scores for the three injury areas.

After specifying the injury area and the degree of injury, the injury types that can be caused due to the accident mechanism are assigned. For example, the difference in the types of damages that a general burn patient and a patient at a fire site can inflict, and the difference in the types and degrees of damages that a slipping patient and a falling patient can inflict may be reflected.

In addition, since it is possible to quantify what kind of damage can occur in which area and how much it occurs through data analysis of actual patients, only a specific injury type is applied to a specific area. As an example, 'dislocation', in which the joint is out of range of motion, may appear only in the joints and limbs, and 'aspiration', in which foreign substances are introduced and impede breathing, will appear only in the neck and chest.

Figure 6:
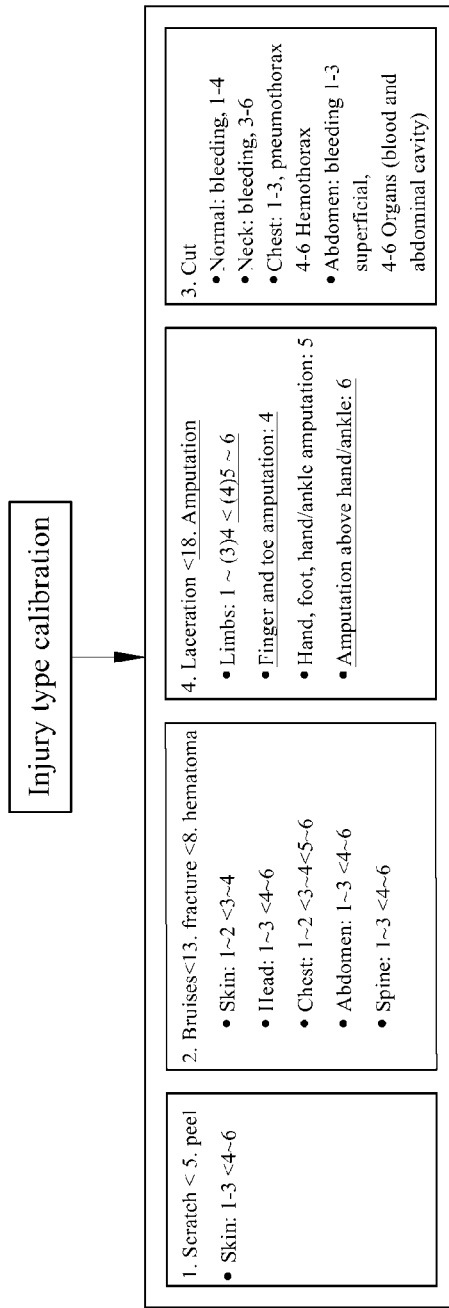

Referring to FIG. 6, after specifying the injury type, the injury type may be further calibrated in consideration of the injury area, the degree of injury, and the injury type. Since it is difficult to assume that abrasions on the skin endanger the patient's life and the survival becomes uncertain when the medical staff arrives, secondary specification criteria are given such that another type of injury is obtained when skin is completely peeled off, rather than only slightly scratched, that is, skin injury has reached a predetermined degree of injury in a case where the 'abrasion' of the skin has more than a certain degree of injury. Blunt injuries change into bruises, fractures, and hematomas to realize symptoms caused by bleeding and accumulation of internal organs, and puncture injuries in the chest cause pneumothorax and hemothorax, causing breathing difficulties.

In step S204, in the emergency patient treatment training method according to an embodiment, a vital sign, that is, a signs of life is specified after injury information is given. In other words, it is configured that values that affects the severity more is specified first. Since the normal range of vital signs depends on the age of the patient, random values are assigned within the normal range according to the age information of the patient specified in the above step. In general, the normal values are given for the respiratory rate, pulse rate, systolic blood pressure, and body temperature by age.

To compose the virtual patient data, diastolic blood pressure and blood oxygen saturation are additionally required, an estimate of the diastolic blood pressure may be calculated by performing subtraction of a certain number from the systolic blood pressure obtained as a result of analyzing the median, average, and range of the actual patient data currently held. For children aged 0-1, −35±5 is added to the systolic blood pressure, and for those older than 1 year, −40±5 is added to the systolic blood pressure. In the case of blood oxygen saturation, the blood oxygen saturation may be randomly assigned within the range of 97±2 to constitute a medically normal value (95% to 100%).

On the other hand, after the normal vital sign values when the patient is not injured are determined, the values of changes in vital signs due to injury are added. The values are obtained by extracting values that showed a significant value from the materials of actual patients who suffered injury in each part. In general, based on the ground in which, it is assumed that samples of at least 30 people per group are required, but it is considered that reasonable results can be obtained even with a sample size of about 15 people per treatment group if strict control is implemented (Roscoe, 1975), the adult (19-64 years old) group from which the most samples can be obtained is selected and samples of patients are classified by injury area, injury type, and degree of injury (represented by the severity of the patient) as injury characteristics, the median and average values are calculated to establish reference values, and a range for each percentile is additionally applied to exclude outliers, thus setting the upper/lower limits and specifying a random value. For example, when a laceration occurs on the surface of the head, the systolic blood pressure increases within the range of 15+(severity−1)*5±5 from an average of 120 for an adult. Regardless of the severity, a trend is applied in which the systolic blood pressure increases within the range of 15±5 when the laceration occurs in the sensory organs (eyes, nose, mouth, ears), and the systolic blood pressure increases by +10±5 for lacerations occurring in other non-major areas. These numerical values may be added or changed as more samples of actual patients are collected and analyzed. On the other hand, since the statistical data held only for oxygen saturation were inappropriate for actual reflection, according to an embodiment, an arbitrary numerical value−(respiration rate)±2 is applied.

In step S205, an additional characteristic of the patient is specified after variation values of the vital signs due to the injury are added.

As for the type of breathing, only when the respiration rate is not normal (>20 in adults, etc.), a type of breathing suitable for the injured state is specified, and when the respiration rate is normal, normal respiration may be specified. The specifying is made based on the medical characteristics of showing tachypnea (shallow and rapid breathing) in the case of chest fractures, pneumothorax, and hemothorax, and hyperventilation (deep and rapid breathing) when harmful gases are inhaled, and Kusmaul breathing (irregular breathing before death) may also be applied.

The pain score is a relative concept, and even when the persons have suffered the same type of injury and the same degree of injury, the pain intensities experienced by the persons may be different. However, for emergency patient treatment training, the pain of the virtual patient is derived based on the injury severity score (ISS) generated, and ±2 is added to a number obtained by multiplying two by the highest ISS value among up to three injury areas, and the maximum value is limited to 10 which is the maximum value of the NRS, the pain scale to be used.

Consciousness scores are assigned using the GCS scale. According to the statistical analysis of actual patients, significant changes were derived when the head and chest were injured in the case of red or higher in MASS severity classification, which is interpreted as ISS ≥4 points of injury to the relevant area, and when it is higher than that, statistical values such as 1 to 4 points of open eye response score have a distribution of 1:1:1:1, respectively, are reflected as they are.

The GCS score representing the patient's consciousness may be reconstructed into the AVPU scale. AVPU classification is measures that expresses whether the patient is awake (A), the patient responds to verbal stimulus (V), the patient responds to pain stimulus (P), and the patient is unresponsive to stimulus (U), respectively. In terms of GCS, when E=4, V=5, M=6, "A" may be indicated, when E=3, "V" may be indicated, when E=2, or M=4-5, "P" may be indicated, or when E=1, V=1, or M>4, "U" may be indicated.

When the patient's characteristics have been specified in step S206, it is calculated which classification is specified when classifying patients based on the patient data as generated above. That is, the correct answer is specified when the user practices patient classification. In order to classify a patient, in addition to the previously-specified variables, walking status, response status, and respiration status are required, so that they are calculated and stored first.

When the patient has suffered a certain level of injury that affects the patient's walking ability, or the patient is difficult to move due to severe pain in a specific area (pain score >6), or when the patient is too young to walk (less than 1 year old), the patient is considered to be unable to walk. In addition, for patients who do not respond to the verbal stimulus, response status (GCS 3 points or more for open-eye response, 2 points or more for verbal response, 6 points or more for motor response) are recorded. The respiratory status is recorded only when spontaneous breathing is present (respiration rate >0).

The three types of patient classification, Modified MASS, START, and SALT, which are widely used worldwide, may be used.

In the emergency patient treatment training method according to an embodiment, a user may select one of the above three classification methods and practice classification of patients and the above criterion arbitrarily specified may be partially changed according to user feedback.

In addition, according to the above-described sequence, it is possible to generate the number, gender, nationality, injury area, degree of injury, injury type, systolic blood pressure, diastolic blood pressure, pulse rate, respiration rate, body temperature, oxygen saturation, type of breathing, pain score, GCS score, AVPU score, walking status, response status, respiratory status, MASS classification, START classification, and SALT classification of the virtual patient.

Referring back to FIG. 2, when the creation of the virtual patient is completed, in step S210, necessary treatment data is automatically allocated based on the vital signs of the created virtual patient.

For example, in step S210, the treatment to be applied preferentially is allocated according to the virtual patient's injury, symptoms, and main complaint. When a patient has multiple types of injuries and symptoms, overlapping portions may occur between treatments. For example, in the case of a patient suffering from breathing difficulties due to burns at the scene of a fire, oxygen administration is instructed in the burn treatment protocol of the manual, and oxygen administration is also instructed in the respiratory distress protocol. When this case occurs, the treatment with the greatest effect among treatments to be given to the patient should be prioritized. A method of determining a treatment will be described in detail with reference to FIGS. 7 to 10.

Figure 7:
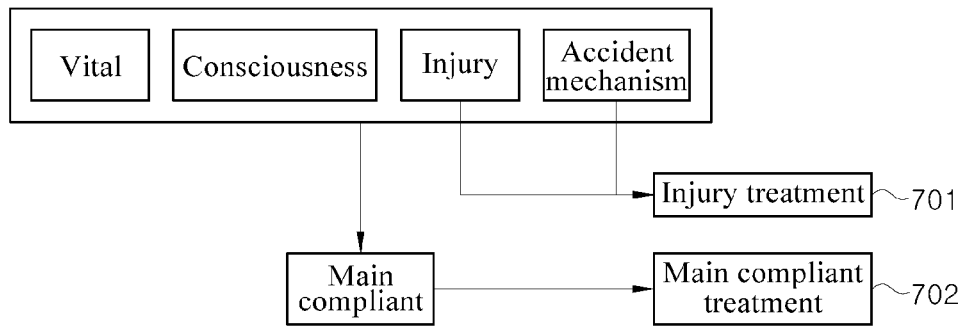

Referring to FIG. 7, in an emergency patient treatment training providing method according to an embodiment, patent treatment may be arbitrarily largely classified into two types. Among them, one is 'injury treatment' (701) based on the patient's injury information (injury area, type, degree, or the like), and the other is 'main-complaint treatment' based on main complaint (702, C/C, Chief Complaint) due to secondary problems due to basic information on the patient (demographic criteria, vital signs, pain, consciousness, type of breathing) and the main complaint caused by the patient's injury.

First, in order to determine and specify the need for the main-complaint treatment, the main complaint due to the secondary problems caused by the patient's basic information and injury information is identified. Among the basic demographic information, age affects the contents of some of the treatments. Among abnormalities in vital signs, abnormalities in respiratory rate and type of breathing require treatments for dyspnea and respiratory arrest, abnormalities in pulse rate require treatments for palpitations and cardiac arrest, and abnormal body temperature require treatments for high fever and hypothermia. A decreased GCS score are followed by treatment for disorders of consciousness.

For nausea/vomiting and convulsions due to head injury, hemoptysis due to lung injury, hematemesis due to abdominal injury, and paralysis of the whole body due to spinal injury, it is possible to check the degree of injury to a relevant area and reproduce the occurrence of symptoms. The criteria for the implementation of symptoms due to injury may be arbitrarily determined by referring to the classification levels and survival statuses of patients having injuries in a relevant area among the actual patient data, and the description within the ISS scale (not threatening survival-threatening survival).

Figure 8:
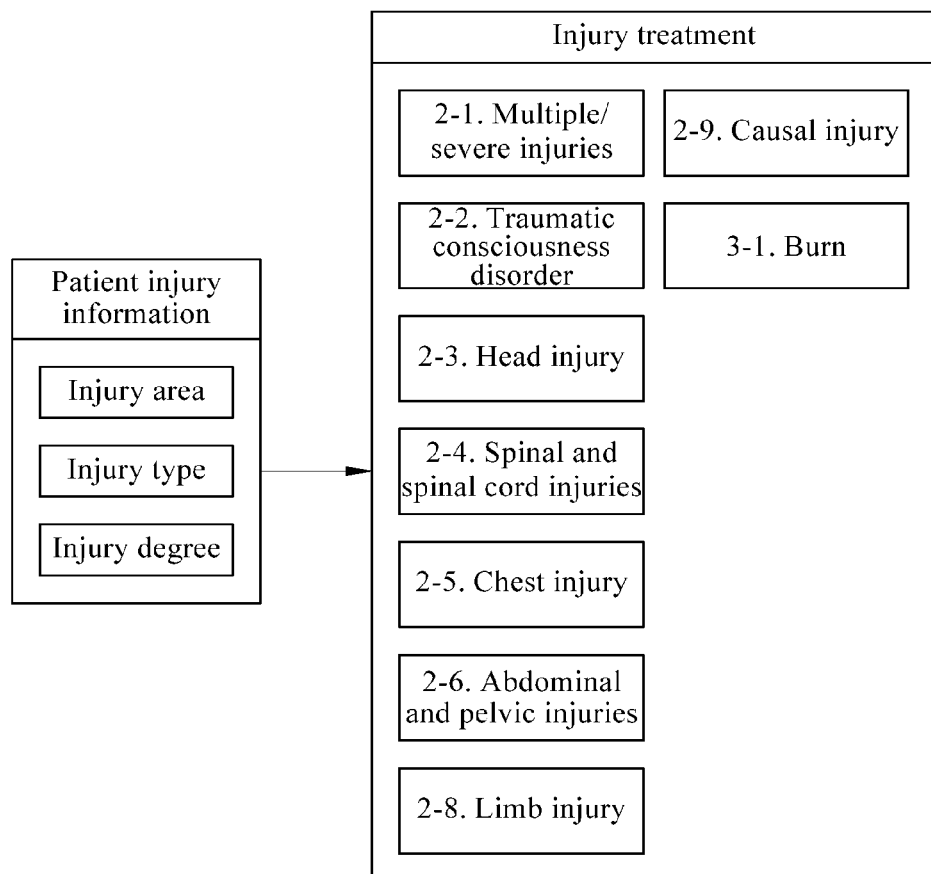

Otherwise, as shown in FIG. 8, a step of specifying direct treatment after identifying a need for the direct treatment due to injury is performed. The treatment for injuries should follow the guidelines of 119 paramedics, which have standards for injury to a certain area or more.

For example, in the case of multiple/severe injury, the physiological criteria are: V or less or 12 GCS or less in AVPU (Alert, Verbal Pain and unresponsive), systolic blood pressure less than 90, respiratory rate less than 10 or more than 30, and among body injuries, flail chest, fractures of two or more proximal long bones, crush/dissection of limbs, amputations of the upper wrist or ankle, and pelvic fractures and paralysis are considered as criteria. For reading of the criteria corresponding to each treatment, a subroutine of an algorithm to be individually determined for each treatment item is configured and applied as shown in FIG. 9.

According to an embodiment, after the assignment of treatment is completed, processes to be actually performed within each treatment protocol are selected and specified. The reason for this is that, for example, a tool used for airway maintenance is changed depending on the level of consciousness (AVPU standards). In order not to perform unnecessary treatment on a patient without a relevant injury, only necessary treatment is assigned to a subroutine in which information of all treatments on the protocol is entered.

Then, when multiple treatments are given to one patient, it is determined whether treatments do not overlap each other and which treatment should be given priority. For example, treatment for burns and dyspnea will be assigned to a patient who has been burned at the fire site and is experiencing hyperventilation by inhaling fire smoke. Since the concentration of oxygen for breathing assistance is not high in general hyperventilation, but a protocol for burn patients specifies that 100% oxygen administration needs to be performed for patients who have been burned at the fire site, a situation arises in which the oxygenation treatment in the burn treatment protocol takes precedence over the oxygenation treatment of hyperventilation. When multiple treatments overlap each other in this way, the strongest treatment for the most serious symptoms should be prioritized.

In order to discriminate between these superiorities, FIG. 10 shows a method of assigning codes to treatment tools according to treatment contents and priorities. Referring to FIG. 10, after assigning codes according to priorities, overlapping treatments within a specific range may be detected through a tool used for treatment, and superiority may be determined according to the priorities assigned to the codes of tools. On the other hand, tools necessary for treatment may be set by grouping overlapping cases after arranging and analyzing all similar treatments. This is to prevent the algorithm decision from becoming complicated as the number of treatment tools increases, such as separately storing an intravenous injection set for securing an intravenous route for intravenous injection and an intravenous fluid.

In the case of oxygen administration to a burn patient as an example in FIG. 10, because a non-rebreather mask is used for high concentration oxygen administration according to the burn treatment protocol, B3 is assigned according to the currently conceived treatment classification code, and in the case of a hyperventilation treatment protocol, B4 using a face mask will be assigned. However, in the case of use of a mask for oxygen administration, it is not possible to use two masks for one person. In this case, the use of a non-rebreather mask, which is an intensive treatment capable of administering a higher concentration of oxygen, needs to be given priority over a nasal cannula or a face mask. For this purpose, the code of the non-rebreather mask may be assigned a higher number in a respiratory assistance category. That is, the higher the number, the lower the treatment priority. In this way, to determine priorities in categories that cannot be overlapped, such as airway maintenance (A, Airway), breathing assistance (B, Breathing), and circulation assistance (C, Circulation), the determination may be easily made by comparing numbers after the category code and giving a higher priority to a smaller number (higher priority).

However, since local injuries such as injury to the skin or musculoskeletal system need to be individually treated without overlapping for each part, treatment and check for overlapping is not performed for treatments to prevent disability (D, Disabilities) caused by injuries and treatments to protect against exposure to the environment (E, Exposure/Environment).

In addition, since on-site emergency responders and nurses should request medical guidance for treatments that cannot be performed independently without a doctor's instruction, such as drug administration, treatment items that require medical guidance are to be assigned codes to distinguish treatment items.

The treatment assigned to the virtual patient in the above-described process may be the 'correct answer' of the treatment required for the patient, and the evaluation data may be decision criteria when determining whether the treatment performed to the patient by the user in the app is correct based on the evaluation data.

Next, referring back to FIG. 2, in step S220, the created virtual patient and vital signs are provided to a user based on augmented reality using a user terminal.

FIGS. 11 to 14 are diagrams for describing an example of a method of providing a virtual patient on a user terminal.

According to an embodiment, vital signs including a state of consciousness for identifying a condition of a virtual patient may be received by the user terminal. A vital sign is a measurement value of respiration, pulse, body temperature, or blood pressure, and the measurement of the vital signs may enable measurement of a patient's health condition through measurement values of consciousness, respiration, pulse, body temperature, and blood pressure.

Figure 11:
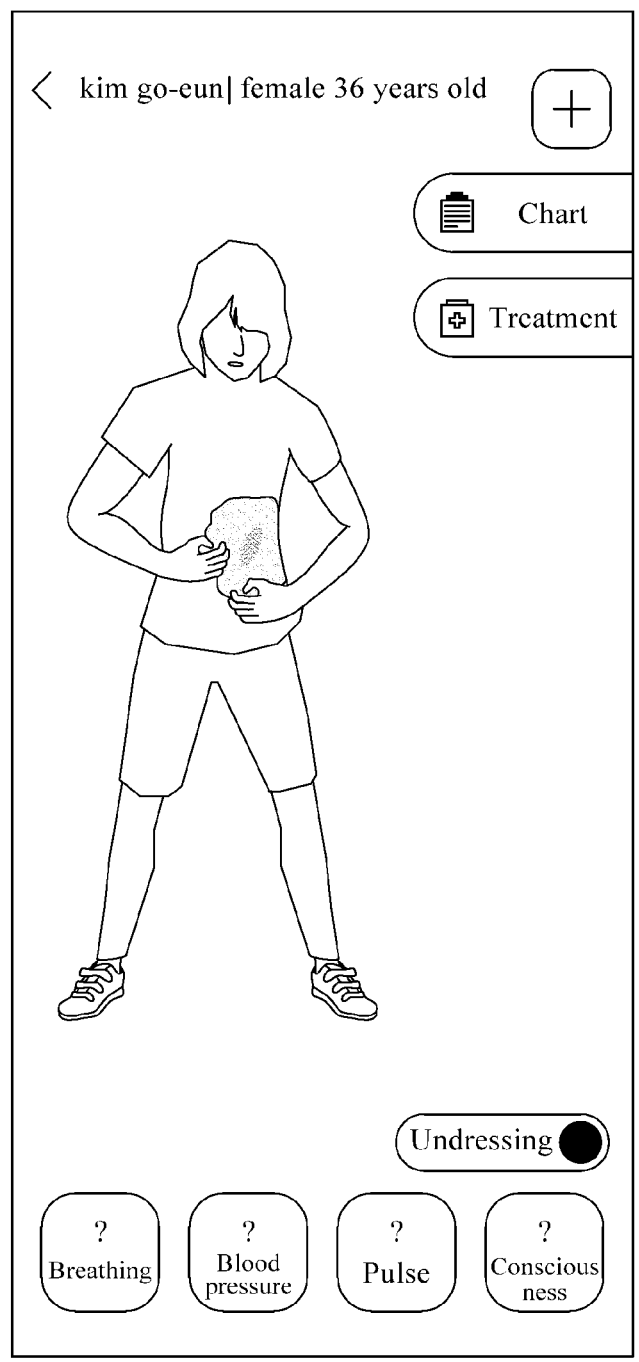
FIGS. 11 to 14 are diagrams for describing an example of a method of providing a virtual patient on a user terminal.

The screen of FIG. 11 provides a visual screen for a virtual patient, and provides to measure vital signs, check charts, treat patients, or check status such as undressing.

Specifically, through the screen of FIG. 11, the user may select respiration, blood pressure, pulse or body temperature to measure respiration, blood pressure, pulse or body temperature, respectively, select a body part and location where the corresponding respiration, blood pressure, pulse or body temperature can be measured, and identify whether an element to be measured is measured in the corresponding body part.

Figure 12:
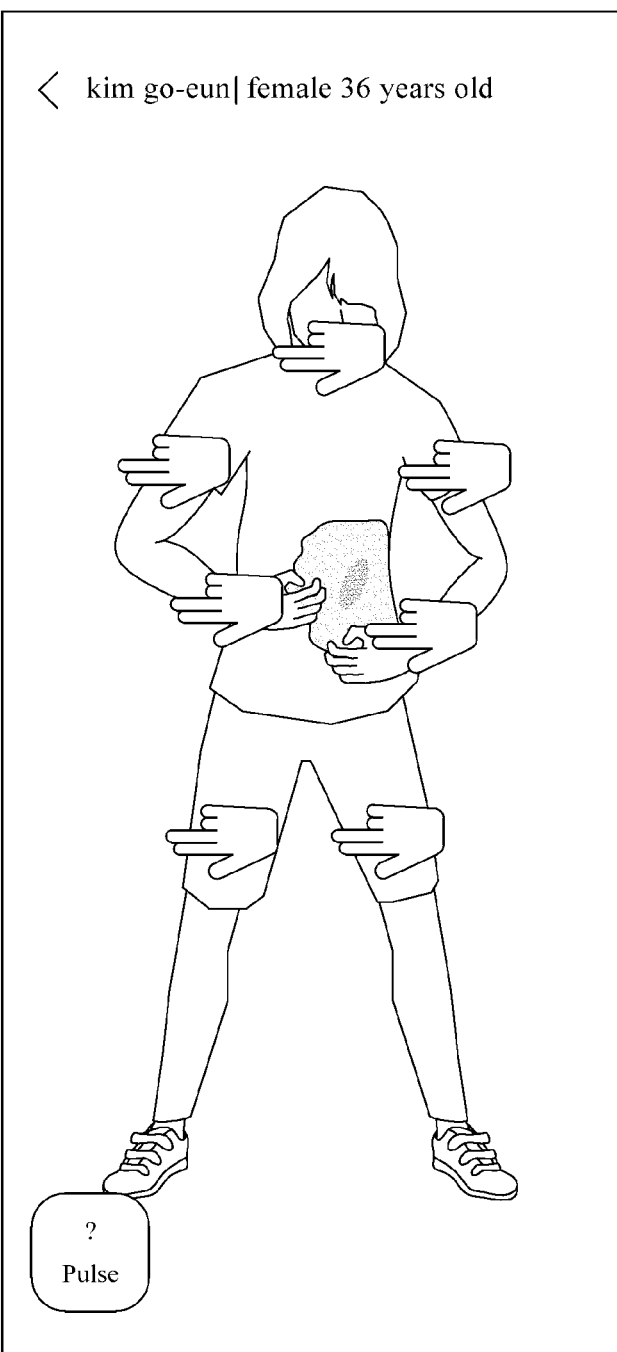

After selecting an element to be measured as shown in FIG. 12, a body part and location may be selected, and when the measurement of the selected element at the corresponding location is not possible, a measurement value may not be derived, or a guide that measurement must be performed at another location may be provided.

The measurable area of each element may be changed for each patient, and the non-measurable and measurable areas may be changed depending on the patient's current condition, so that the user can directly select the measurement area after visually checking the patient's condition through the screen, allowing the user to figure out the patient's condition by measuring vital signs more accurately and quickly in a similar real situation.

Figure 13:
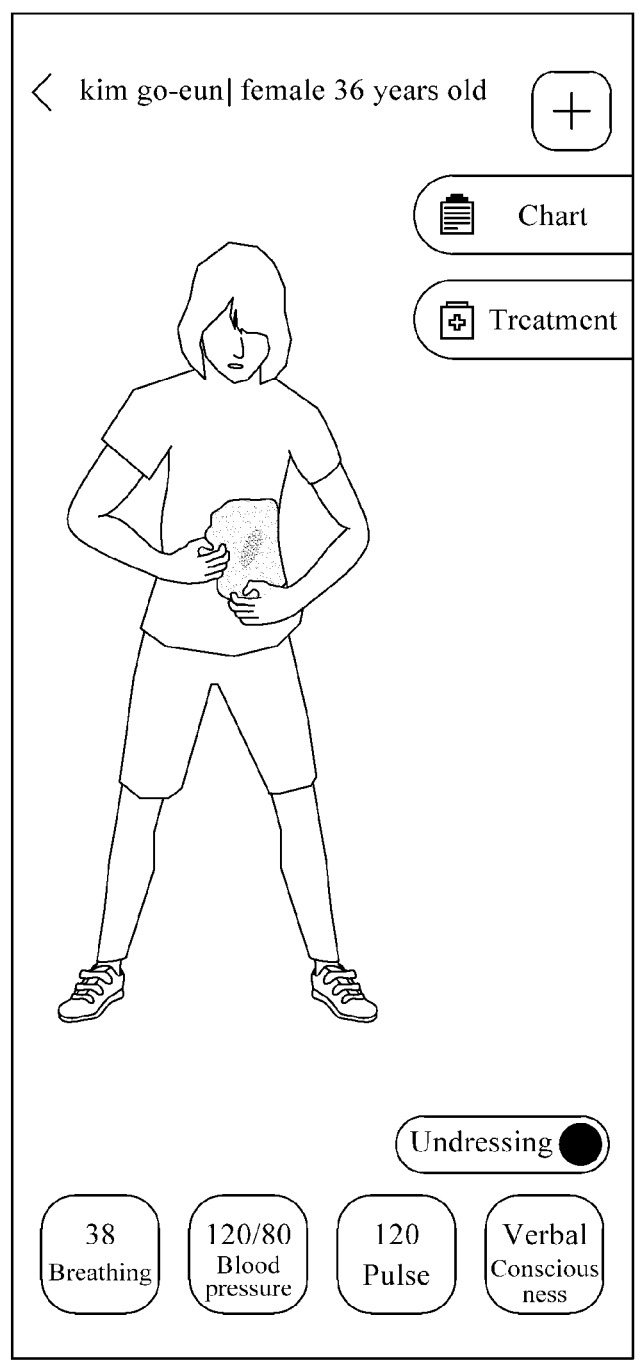

As described above, when all the vital signs are measured, the measurement values of the vital signs are displayed on the screen as shown in FIG. 13. The user may figure out the condition of the patient based on the measured values, and may perform treatment based on the condition.

Figure 14:
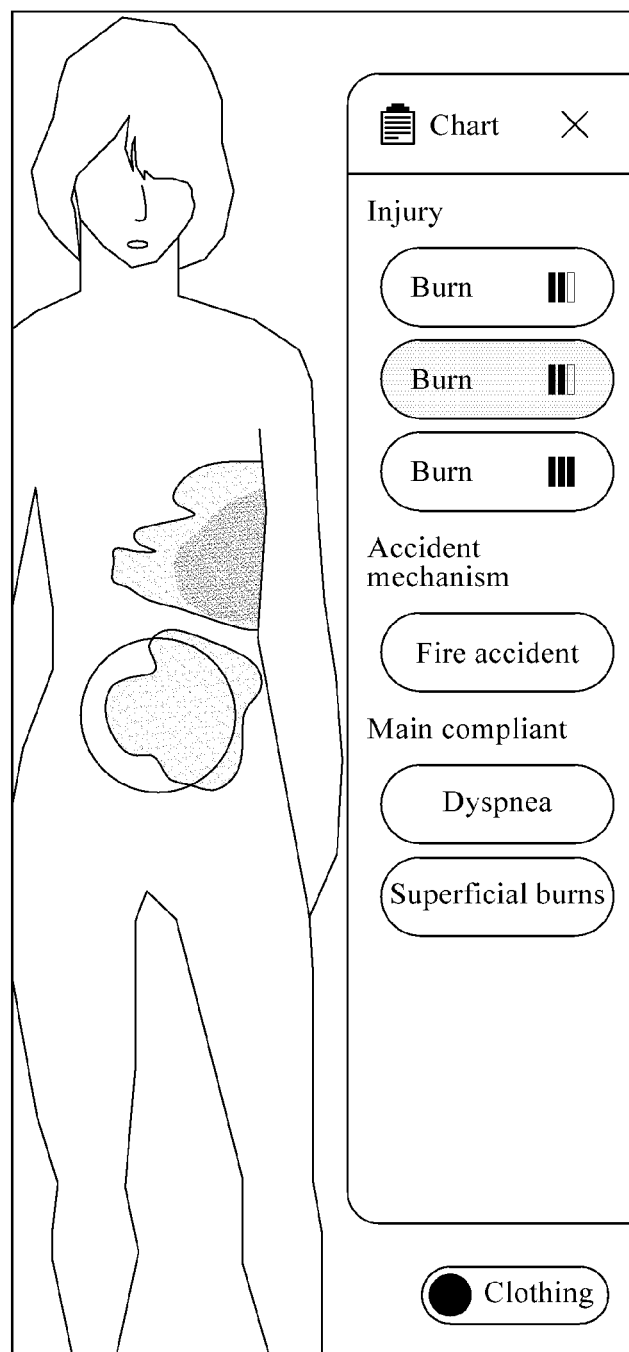

In addition, referring to FIG. 14, when a chart is selected on the screen, information on the main complaint indicating the degree of injury to the patient, accident mechanism, symptoms, and the like may be identified.

Figure 15:
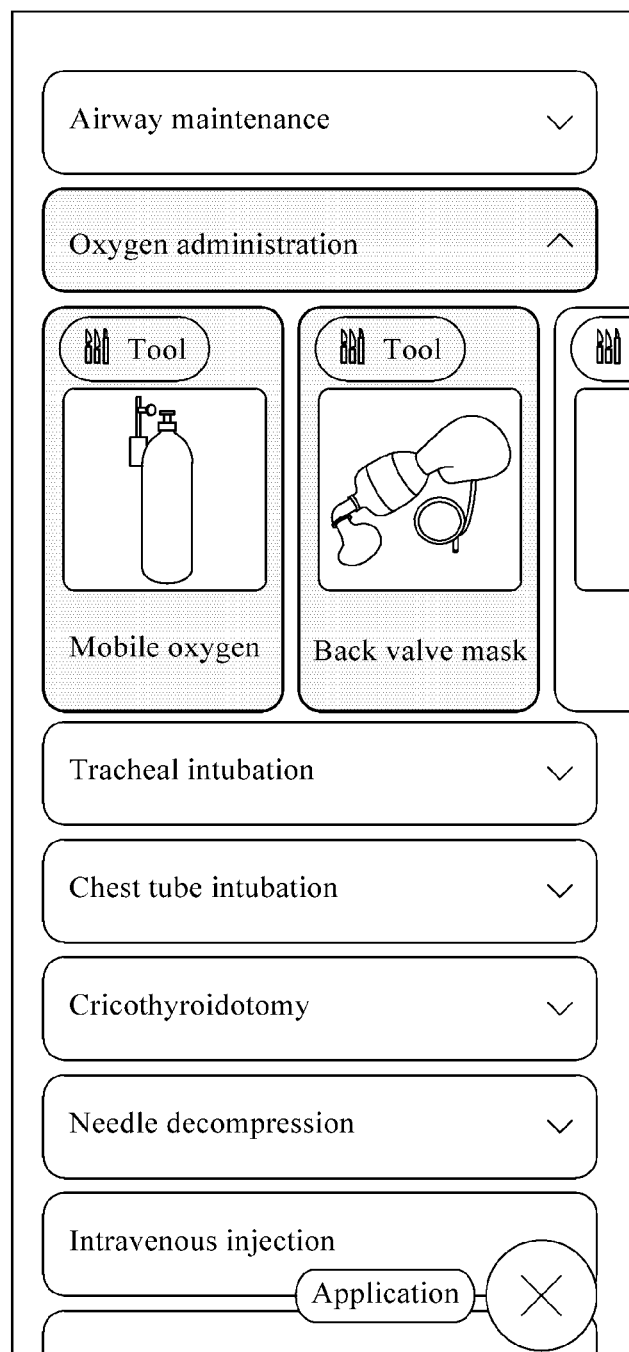
FIG. 15 shows various types of treatments and treatments applicable to a virtual patient and an example of a kit usable for the treatments on a user terminal.

Next, in step S230, the emergency patient treatment training method according to an embodiment may receive the result of the user's treatment based on the vital signs of the virtual patient through the user terminal. Here, as shown in FIG. 15, the user terminal may provide various types of treatments that can be applied to the virtual patient and tools that can be used in the corresponding treatment to be selected.

The user may perform a treatment corresponding to the current condition of the virtual patient among various types of provided treatment and various types of tools, and the server may receive the performed treatment.

The various types of treatments may include simple first aid at the disaster site and surgeries, and include at least one of airway maintenance, oxygen administration, tracheal intubation, chest tube intubation, cricothyroidectomy, needle chest decompression, intravenous injection, and wound sterilization. The various types of tools may include portable oxygen, bag valve masks, and dressing sets.

In addition, the user may directly add a treatment method through the screen providing selection of treatment methods.

Figure 16:
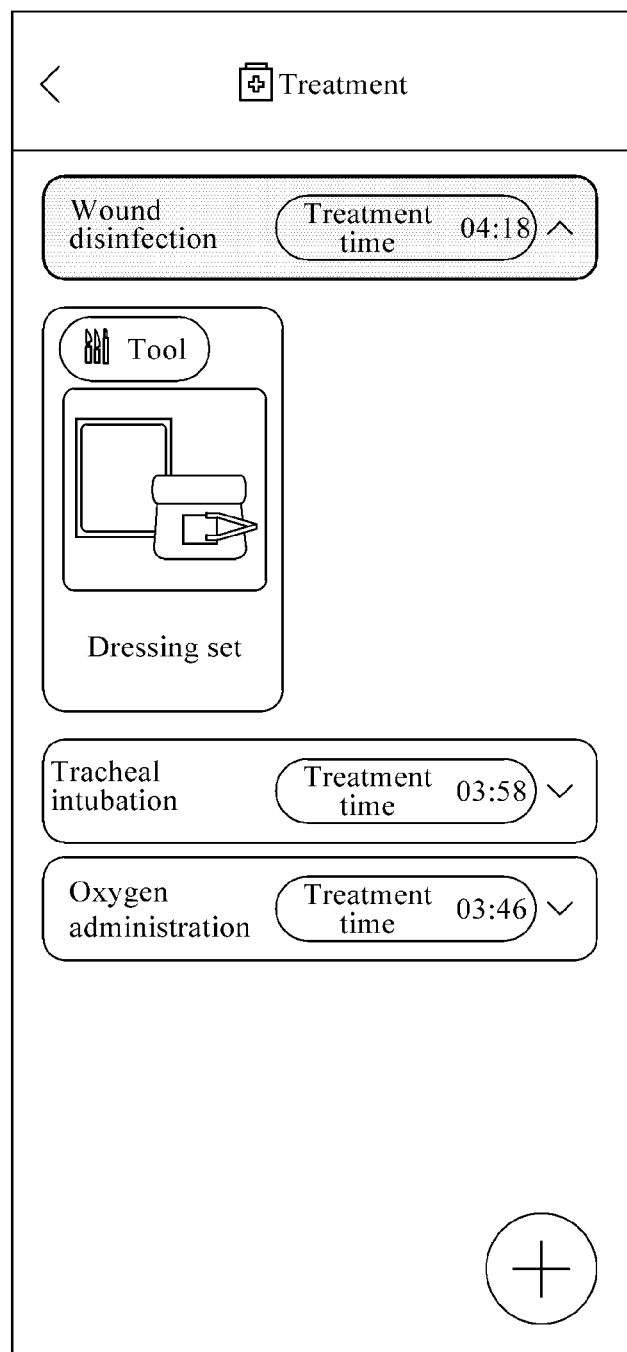
FIG. 16 illustrates an example of a screen for a result of treatment performed on a user terminal.

According to a predetermined treatment method for the virtual patient, the result of treatment in step S230 may include at least one of a performed treatment method, a tool used for the treatment, and treatment time, as shown in FIG. 16 and may be provided.

The provision of the result of treatment may provide not only the result of treatment, but also changes in the patient according to treatment, the number of trials of each treatment, the number of rescued patients, or the like as an evaluation of treatment.

The number of trials of each treatment is, for example, how many times CPR was performed, and in the case of a treatment that requires the number of trials, the number of trials may be provided.

In step S240, the evaluation data is provided by comparing the treatment data for the virtual patient and the results of the user's treatment.

According to an embodiment, the treatment assigned to the virtual patient in step S210 may be the 'correct answer' of the treatment required for the patient, and the evaluation data may be decision criteria when determining whether the treatment performed to the patient by the user in the app is correct based on the evaluation data.

In other words, the evaluation is feedback on the user's experience, and may be output after the session is terminated by determining whether the treatment performed by the user within the session is appropriate (Right), excessive (Over), wrong (Wrong), or omitted (None) compared to treatments specified as the correct answer in the protocol.

For example, when the oropharyngeal airway (A4) instead of the nasopharyngeal airway (A5) is applied to a patient who is conscious of V or higher and needs airway maintenance, it is over treatment, when a patient with hypoglycemic symptoms is given 50% glucose solution orally (D11D) instead of an intravenous injection (C6D), it is a wrong treatment, and when the dead patient is not covered with a blanket (E3), none of treatment occurs (None).

Since among non-overlapping treatments, priorities of some treatments is determined in sequence numbers, but in the case of injuries, it is not simple to distinguish between appropriate and incorrect treatments, each set of tools may be specified by creating a separate protocol for each injury.

Before performing a treatment requiring medical guidance, it should be evaluated whether medical guidance has been requested, and when a treatment requiring medical guidance is performed without medical guidance, it should be evaluated as a wrong treatment.

The final evaluation of treatment may be displayed on a screen at the end of the session by calculating the proportion of non-correct treatments with respect to the total number of treatments required for a patient, and printed out with help such that it can be seen that which treatment for each patient was wrong for each patient. For example, in the case of provision of oxygen to burn patients described above, instructions could be displayed saying "For all burn patients rescued at the scene of a fire, 100% oxygen should be provided through a non-rebreather mask."

According to an embodiment, the user identifies the patients distributed in the session one by one, classifies the severity first, and performs emergency treatment on the patient in need of treatment by priority. When the treatments are finished, the evaluation for the user is performed in stages with respect to the classification of the patients, the priority of the treatment, and the adequacy of the treatment.

First, the classification is evaluated by determining whether the user's classification for each patient is correct according to the classification method selected at the beginning of a training session (or specified by an instructor within a training class). When the classification is incorrect, 1/n for the total number of patients is subtracted from a classification total score with respect to each patient for which the classification is incorrect. That is, when 2 out of 10 patients are incorrectly classified, a final classification accuracy is 80%.

The priority is evaluated by determining whether dangerous patients have been treated by priority. When treatment is performed on patients with low priority (Yellow, Green) by priority, than patients who urgently need treatment (Red), 1/n for the total number of patients is subtracted from the total priority score with respect to each patient which has been treated in the wrong treatment sequence. When, in a training session with 3 red patients and 2 yellow patients, 2 red patients are treated first, but the remaining 2 yellow patients are treated and then the red patient is treated last, the priorities of the treatments for 2 patients among 5 patients are not suitable, so that the priority evaluation score is 60% by performing subtraction from a priority total score with respect to each patient for which the treatment priories are not suitable.

In the case of treatment adequacy evaluation, the number of incorrect treatments is calculated compared to the total number of treatments. For example, when 10 patients had required 40 treatments and there were 8 mistakes, the final adequacy score would be 80% by performing subtraction of 1/n for each mistake.

Figure 17:
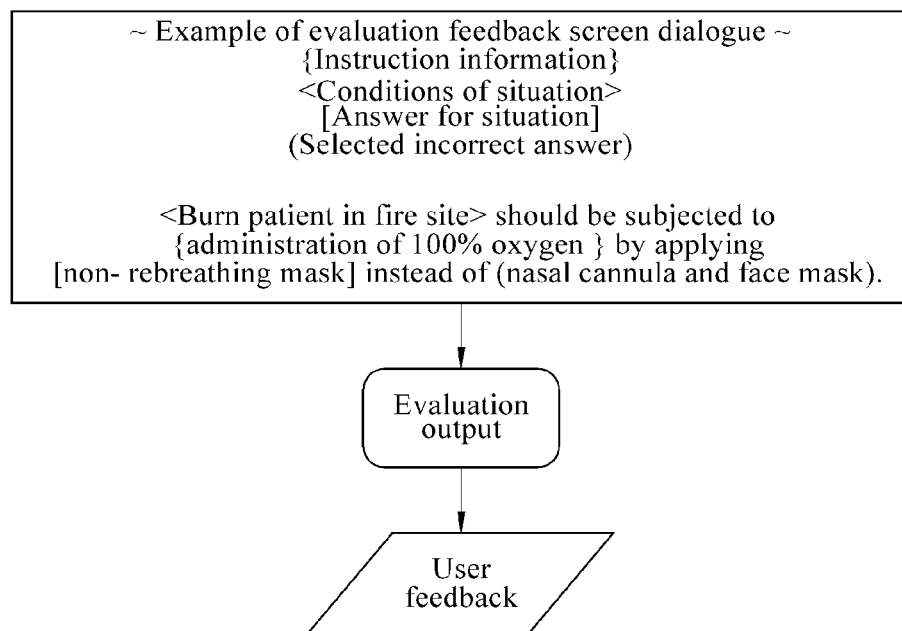
FIG. 17 illustrates an example of an emergency patient evaluation screen according to an embodiment.

As an example, referring to FIG. 17, on the final evaluation screen, the user may be informed of which type of each treatment was erroneously performed. That is, the contents of all treatments are stored in the session execution results and displayed.

In addition, it is possible to configure an environment in which correct and incorrect answers can be identified along with instructions on the patient-specific evaluation screen such that the user can remember the patient when checking what treatment was performed on the patient and to receive information on improvement, such as differences between the field and the guidelines or the like through the feedback of the instructor and to revise correct answers in the algorithm, criterion for evaluation, or the like.

Figure 18:
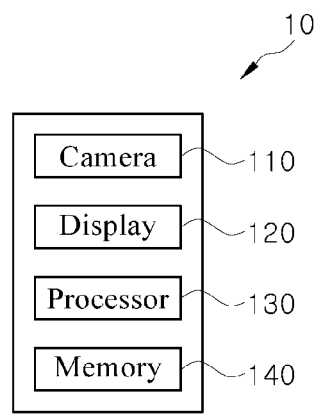
FIG. 18 is a block diagram schematically showing an internal configuration of an emergency patient treatment training apparatus 10 according to an embodiment.

FIG. 18 is a block diagram schematically showing an internal configuration of an emergency patient treatment training apparatus 10 according to an embodiment.

The emergency patient treatment training apparatus 10 according to an embodiment may include a camera 110, a display 120, a processor 130, and a memory 140. The operation of the emergency patient treatment training apparatus 10 may be performed by executing a program stored in the memory 140 through the processor 130. FIG. 18 shows only a configuration for describing the operation of the emergency patient treatment training apparatus 10 for convenience of description, but it is apparent to those skilled in the art to which the inventive concept pertains that various configurations for performing the operation described above in FIGS. 1 to 17 may be additionally included.

The processor 130 according to an embodiment may perform control to provide a user with an image including a virtual patient card photographed by the emergency patient camera 110 or an image in which an image related to the virtual patient and the photographed image are synthesized based on an augmented reality technique through the display 120.

Meanwhile, the emergency patient treatment training apparatus 10 described above may include one or more processors 130 and/or one or more memories 140. Furthermore, the memories 140 may include volatile and/or non-volatile memory. The one or more memories 140 may store instructions that, when executed by the one or more processors 130, cause the one or more processors 130 to perform an operation.

In an embodiment, the operations performed by the one or more processors 130 may include an operation to create a virtual patient that is scored according to the condition of the virtual patient based on medical statistics, an operation to automatically allocate necessary treatment data based on the generated vital signs of the virtual patient; an operation to provide the generated virtual patient and the vital signs to a user based on augmented reality using a user terminal, an operation to receive results of the user's treatment based on the vital signs of the virtual patient in the user terminal and an operation to provide evaluation data by comparing the treatment data for the virtual patient with the results of the user's treatment.

According to the inventive concept, there is an effect that users who perform training can deal with an emergency patient based on the training contents even in a real situation by being trained using a virtual patient more similar to a real patient.

In addition, according to the inventive concept, it is possible to easily implement a virtual patient with symptoms desired by a user who provides training.

In addition, according to the inventive concept, even in the case of a special disease occurring in a specific region, it is possible to implement a 3D virtual patient similar to an actual patient.

However, effects of the inventive concept may not be limited to the above-described effects. Although not described herein, other effects of the inventive concept can be clearly understood by those skilled in the art from the following description.

The steps of a method or algorithm described in connection with the embodiments of the present disclosure may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of providing emergency patient treatment training, the method being performed by an apparatus, the method comprising:

creating a virtual patient scored according to a condition of the virtual patient based on medical statistics;

setting vital signs by additionally deriving symptoms caused by injuries of the created virtual patient and severity classification-the vital signs being measurement values of respiration, pulse, body temperature, and blood pressure, and including at least one of injuries, symptoms, main complaint required for treatment of the virtual patient;

automatically assigning necessary treatment data based on the set vital signs;

providing the created virtual patient and the vital signs to a user based on augmented reality using a user terminal;

receiving a result of treatment for the virtual patient by the user based on the vital signs of the virtual patient through the user terminal; and providing evaluation data by comparing the treatment data for the virtual patient and the result of the treatment for the virtual patient by the user, wherein, when creating the virtual patient, an injury area, a degree of injury, and an injury type of the virtual patient are determined, the degree of injury for each injury area is set to a preset value, the degree of injury greater than a certain degree is given to a severe patient, and after the injury area and the degree of injury are specified, the injury type capable of occurring due to an accident mechanism is given, and wherein the degree of injury is given based on an injury severity score (ISS).

2. The method of claim 1, wherein the providing of the virtual patient includes recognizing an image virtual patient card photographed by the user terminal; and displaying the virtual patient based on augmented reality on the recognized virtual patient card.

3. The method of claim 2, wherein the providing of the virtual patient includes providing the virtual patient to the user and a plurality of additional users in which have recognized the virtual patient card, wherein the virtual patient with a condition corresponding to a performed treatment is provided to the user and the plurality of additional users when the treatment is performed on the virtual patient by at least one user among the user and the plurality of additional users.

4. The method of claim 1, wherein the scored virtual patient is determined based on preselected user ability, accident location, accident type, number of patients, and difficulty level.

5. The method of claim 4, wherein the scored virtual patient has reflected, as a score, at least one value of age, gender, nationality, injury site, injury type, injury degree, respiration rate, pulse rate, blood pressure, body temperature, blood oxygenation level, type of breathing, pain level, and level of consciousness (Glasgow Coma Scale).

6. A non-transitory computer-readable storage medium having stored therein computer-executable instructions which, when executed by a computer hardware, perform the method of providing emergency patient treatment training of claim 1.

7. An apparatus for providing emergency patient treatment training, the apparatus comprising:

one or more processors; and
one or more memories configured to store instructions that, when executed by the one or more processors, cause the one or more processors to perform an operation,
wherein the operation performed by the one or more processors includes
operation for creating a virtual patient scored according to a condition of the virtual patient based on medical statistics;
operation for setting vital signs by additionally deriving symptoms caused by injuries of the created virtual patient and severity classification—the vital signs being measurement values of respiration, pulse, body temperature, and blood pressure, and including at least one of injuries, symptoms, main complaint required for treatment of the virtual patient;
operation for automatically assigning necessary treatment data based on the set vital signs;
operation for providing the created virtual patient and the vital signs to a user based on augmented reality using a user terminal;
operation for receiving a result of treatment for the virtual patient by the user based on the vital signs of the virtual patient through the user terminal; and
operation for providing evaluation data by comparing the treatment data for the virtual patient and the result of the treatment for the virtual patient by the user,
wherein, when creating the virtual patient, an injury area, a degree of injury, and an injury type of the virtual patient are determined, the degree of injury for each injury area is set to a preset value, the degree of injury greater than a certain degree is given to a severe patient, and after the injury area and the degree of injury are specified, the injury type capable of occurring due to an accident mechanism is given, and
wherein the degree of injury is given based on an injury severity score (ISS).

8. The apparatus of claim 7, wherein the operation for providing the virtual patient includes operation for recognizing an image virtual patient card photographed by the user terminal; and
operation for displaying the virtual patient based on augmented reality on the recognized virtual patient card.

9. The apparatus of claim 8, wherein the operation for providing the virtual patient includes operation for providing the virtual patient to the user and a plurality of additional users in which have recognized the virtual patient card, wherein the virtual patient with a condition corresponding to a performed treatment is provided to the user and the plurality of additional users when the treatment is performed on the virtual patient by at least one user among the user and the plurality of additional users.

* * * * *